United States Patent
Shirayanagi

[19]

[11] Patent Number: 6,056,401
[45] Date of Patent: May 2, 2000

[54] SPECTACLE LENS

[75] Inventor: Moriyasu Shirayanagi, Tokyo, Japan

[73] Assignee: Asahi Kogaku Kogyo Kabushiki Kaisha, Tokyo, Japan

[21] Appl. No.: 08/929,005

[22] Filed: Sep. 4, 1997

[30] Foreign Application Priority Data

Sep. 5, 1996 [JP] Japan ................................ 8-235397

[51] Int. Cl.$^7$ .................................................. G02C 7/02
[52] U.S. Cl. ............................................. 351/159; 351/41
[58] Field of Search .......................... 351/159, 168–169, 351/176, 41, 44; 359/708–712

[56] References Cited

U.S. PATENT DOCUMENTS

| Re. 17,435 | 9/1929 | Tilyer | 351/159 |
|---|---|---|---|
| 4,055,379 | 10/1977 | Winthrop | 351/169 |
| 5,050,979 | 9/1991 | Shinohara | 351/159 |
| 5,050,980 | 9/1991 | Shinohara | 351/167 |
| 5,270,746 | 12/1993 | Kato et al. | 351/176 |
| 5,353,072 | 10/1994 | Tejima et al. | 351/159 |
| 5,648,832 | 7/1997 | Houston et al. | 351/159 |
| 5,767,939 | 9/1998 | Komatsu et al. | 351/159 |
| 5,805,263 | 9/1998 | Reymondet et al. | 351/159 |
| 5,825,455 | 10/1998 | Fecteau et al. | 351/159 |

FOREIGN PATENT DOCUMENTS

| 2289818 | 11/1990 | Japan . |
|---|---|---|
| 2289819 | 11/1990 | Japan . |
| 4-45419 | 2/1992 | Japan . |

*Primary Examiner*—Georgia Epps
*Assistant Examiner*—Jordon M. Schwartz
*Attorney, Agent, or Firm*—Greenblum & Bernstein, P.L.C.

[57] ABSTRACT

A spectacle lens having a geometric center includes front and rear surfaces, each formed as a refractive surface. At least one of the front and rear surfaces is formed as an aspherical surface in rotational symmetry about an axis of symmetry. The axis of symmetry is separated from the geometric center.

12 Claims, 18 Drawing Sheets

SPECTACLE LENS

BACKGROUND OF THE INVENTION

1. Field of the Invention

The present invention relates to a spectacle lens for correcting eyesight.

2. Description of the Related Art

It is desirable for a spectacle lens used for correcting eyesight (near-sightedness, far-sightedness, astigmatism, etc.) to be formed such that the curvature of the front surface of the lens is gentle (i.e., the curvature of the front surface of the lens is small), and that both the central and peripheral thicknesses of the lens are small, while maintaining satisfactory optical performance. The reason for this is that in recent years great importance has been paid to the appearance of the lens and the comfort in wearing the lens. It is also desirable that the spectacle lens can be easily made so as to reduce the cost of production.

In a conventional spectacle lens having a spherical surface or a toric surface, the curvature of the front surface of the lens becomes somewhat sharp (i.e., the curvature of the front surface of the lens becomes large) when greater importance is placed on the optical performance of the lens, rather than the appearance of the lens or the comfort in wearing the lens. Specifically, in such a case, the central thickness of the lens or the peripheral thickness of the lens becomes large when the conventional spectacle lens is a negative lens or a positive lens, respectively. Therefore, such a conventional spectacle lens is heavier and less comfortable when greater importance is placed on the optical performance of the lens. Conversely, in the case where the front surface of the lens is formed to have a gentle curvature so as to improve the appearance of the lens or the comfort in wearing the lens, optical performance deteriorates.

In order to improve the appearance of the lens and the comfort in wearing the lens while maintaining the optical performance of the lens, a lens having a front aspherical surface to reduce the curvature of the front surface of the lens while maintaining satisfactory optical performance of the lens has been recently proposed. Such an aspheric lens is disclosed in each of U.S. Pat. Nos. 5,050,979, 5,050,980 and 5,270,746.

Each of U.S. Pat. Nos. 5,050,979 and 5,050,980 discloses a spectacle lens provided at its front with an aspherical surface which is rotationally symmetrical (i.e., rotationally-symmetrical aspherical surface). In the case where the front surface of a spectacle lens is formed as a rotationally-symmetrical aspherical surface, the curvature of the front surface becomes more gentle compared with that of the front surface of a spectacle lens which is formed as an optimum spherical surface. The lens appearance thus improves while the thickness and the weight of the lens are reduced.

However, such a conventional spectacle lens provided with the rotationally-symmetrical aspherical surface at its front does not exhibit excellent optical performance over the entire object distance range. Namely, such a conventional spectacle lens can be designed to exhibit an excellent optical performance only over a limited object distance range. FIGS. 9, 10 and 11 show an example of such a conventional spectacle lens (example 1), and FIGS. 12, 13 and 14 show another example of the same (example 2).

In FIG. 9, reference numerals 47, 57, 27 and 37 designate the front surface, the rear surface, the intersection of the rotational axis of the lens (which extends through the geometric center thereof with the front surface) and the center of the aspherical surface, respectively. Likewise, in FIG. 12, reference numerals 48, 58, 28 and 38 designate the front surface, the rear surface, the intersection of the rotational axis of the lens (which extends through the geometric center thereof with the front surface) and the center of the aspherical surface, respectively. In each example, the intersection 27 or 28 is coincident with the center of the aspherical surface 37 or 38, as can be seen from FIG. 9 or 12. Lens data regarding these examples is shown below.

EXAMPLE 1

Vertex Power −6.00 D

Front Surface paraxial curvature +2.00 D (rotationally-symmetrical aspherical surface)

Rear Surface curvature −14.00 D (spherical surface)

Refractive Index 1.50

Diameter $\phi$75 mm

Central Thickness 2.0 mm

Peripheral Thickness 10.8 mm

Front Sag 1.8 mm

EXAMPLE 2

Vertex Power +3.00 D

Front Surface paraxial curvature +8.00 D (rotationally-symmetrical aspherical surface)

Rear Surface curvature −2.10 D (spherical surface)

Refractive Index 1.50

Diameter $\phi$72 mm

Central Thickness 4.3 mm

Peripheral Thickness 1.0 mm

Front Sag 4.7 mm

U.S. Pat. No. 5,270,746 discloses a spectacle lens provided with an aspherical surface at its front which is non-rotationally symmetrical (i.e., non-rotationally-symmetrical aspherical surface). The spectacle lens is a bifocal lens. The upper half of the front surface, which is for viewing a distant object, has a different curvature from that of the lower half of the front surface which is intended for viewing a closer object. This overcomes the defects in a spectacle lens formed as a spherical lens or an aspheric lens having a rotationally-symmetrical aspherical surface.

However, it is difficult to form such a bifocal lens. The appearance of the lens also does not look good because the thickness of the periphery of the lens at an upper portion thereof is different from that at a lower portion thereof. FIGS. 15 through 18 show an example of such a bifocal spectacle lens (example 3).

In FIG. 15 or 16, reference numerals 49, 59, 29 and 39 designate the front surface, the rear surface, the intersection of the rotational axis of the lens (which extends through the geometric center therefor with the front surface) and the supposed center of the non-rotationally symmetrical aspherical surface which is determined for the purpose of design, respectively. In example 3, the intersection 29 is coincident with the supposed center 39, as can be seen from FIG. 16. Lens data regarding example 3 is shown below.

EXAMPLE 3

Vertex Power +3.00 D

Front Surface central curvature +8.40 D (non-rotationally-symmetrical aspherical surface)

Shape of Front Surface See FIG. 15

Shape of Cross-Sectional View See FIG. 16

Aberration See FIG. 18

SUMMARY OF THE INVENTION

The primary object of the present invention is to provide a spectacle lens which can be easily made but whose front surface has a small curvature, whose thicknesses at the upper and lower peripheries are even to improve the lens appearance and which can be formed thin and lightweight, while exhibiting a satisfactory optical performance through the entire object distance range.

To achieve the object mentioned above, according to an aspect of the present invention, a spectacle lens having a geometric center is provided including front and rear surfaces formed as refractive surfaces. At least one of the front and rear surfaces is an aspherical surface in rotational symmetry about an axis of symmetry. The axis of symmetry is separated from the geometric center.

Preferably, at least one reference marking is provided for positioning the spectacle lens with respect to a spectacle frame.

The axis of symmetry is preferably positioned below the geometric center.

In order to improve the optical performance of the spectacle lens through the entire object distance range, a curvature of the aspherical surface along a meridian thereof preferably increases as a distance from a center of the aspherical surface to a periphery of the aspherical surface increases, at least in a range of 10 to 20 mm from the center of the aspherical surface to the periphery along the meridian, when the spectacle lens has a negative vertex power. Conversely, when the spectacle lens has a positive vertex power, a curvature of the aspherical surface along a meridian thereof preferably decreases as a distance from a center of the aspherical surface to a periphery of the aspherical surface increases, at least in a range of 10 to 20 mm from the center of the aspherical surface to the periphery along the meridian.

Preferably, one of the front and rear surfaces is formed as an aspherical surface and the other of the front and rear surfaces is formed as a spherical surface or a toric surface. With this arrangement, the spectacle lens can be manufactured much easier.

Preferably, a center of the aspherical surface is separated from an intersection of the axis of symmetry with the aspherical surface.

Preferably, a center of the aspherical surface is positioned below an intersection of the axis of symmetry with the aspherical surface.

In another aspect of the present invention, a spectacle lens with a negative vertex power is provided having front and rear surfaces formed as refractive surfaces. At least one of the front and rear surfaces is an aspherical surface in rotational symmetry about an axis of symmetry. At least one reference marking is formed on the spectacle lens for positioning the spectacle lens with respect to a spectacle frame. The axis of symmetry extends through a part of the spectacle lens, the thickness of the part increasing and decreasing in a direction downwards and upwards from the axis of symmetry, respectively.

In yet another aspect of the present invention, a spectacle lens having a positive vertex power is provided with front and rear surfaces formed as a refractive surfaces. At least one of the front and rear surfaces is an aspherical surface in rotational symmetry about an axis of symmetry. At least one reference marking is formed on the spectacle lens for positioning the spectacle lens with respect to a spectacle frame. The axis of symmetry extends through a part of the spectacle lens, the thickness of the part increasing and decreasing in a direction upwards and downwards from the axis of symmetry, respectively.

In yet another aspect of the present invention, a spectacle lens having a geometric center is provided. Front and rear surfaces are refractive surfaces. An aspherical surface is formed on at least one of the front and rear surfaces in rotational symmetry about an axis of symmetry. The axis of symmetry is separated from the geometric center.

The terms "the center of a rotationally-symmetrical aspherical surface" or "the center of an aspherical surface" used herein refer to the intersection of the axis of symmetry of the aspherical surface with the aspherical surface.

The present disclosure relates to subject matter contained in Japanese Patent Application No. 8-235397 (filed on Sep. 5, 1996) which is expressly incorporated herein by reference in its entirety.

BRIEF DESCRIPTION OF THE DRAWINGS

The invention will be described below in detail with reference to the accompanying drawings in which.

DESCRIPTION OF THE PREFERRED EMBODIMENTS

Embodiment 1

Figure 4:
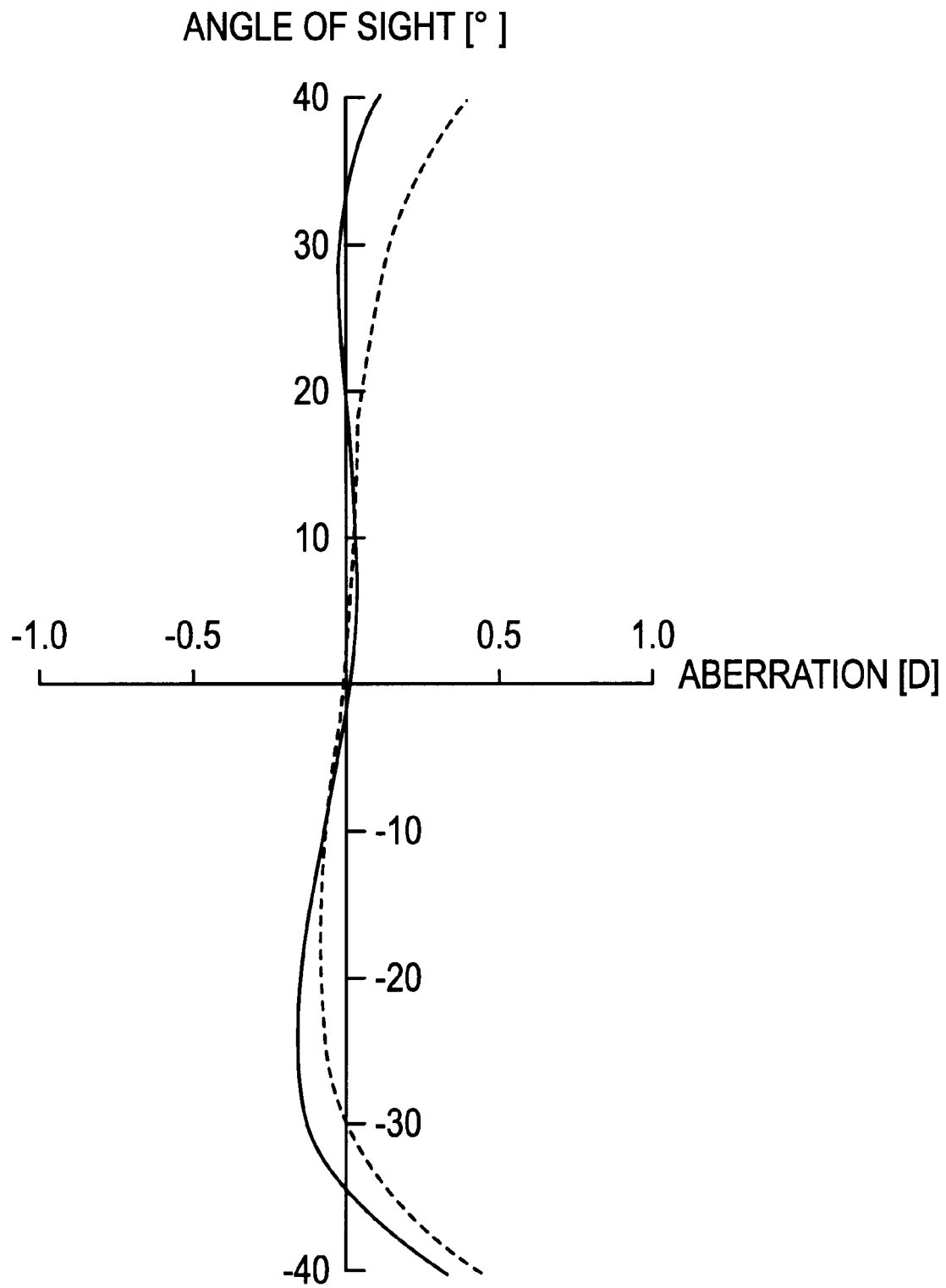
FIG. 4 is a graph showing an astigmatism and a field curvature with respect to the angle of sight of the spectacle lens shown in FIG. 1.

FIGS. 1 through 4 show a first embodiment of a spectacle lens for correcting eyesight. This spectacle lens 11 is a negative lens intended for near-sightedness. In FIG. 4, the vertical axis of the graph represents an angle of sight in degrees, and the horizontal axis of the graph represents an aberration in diopters based on a reference refractive power in a sagittal direction of the lens. Also in FIG. 4, the solid line represents the astigmatism of the lens 11 while the dotted line represents the field curvature of the lens 11. The astigmatism and the field curvature of the lens 11 in the positive range of the angle of sight (from 0 to approximately 40 degrees) represent those when an object at infinity ($\infty$) is viewed through the upper half portion of the lens 11. The astigmatism and the field curvature of the lens 11 in the negative range of the angle of sight (from 0 to approximately −40 degrees) represent those when an object 30 cm away from the lens 11 is viewed through the lower half portion of the lens 11.

Figure 1:
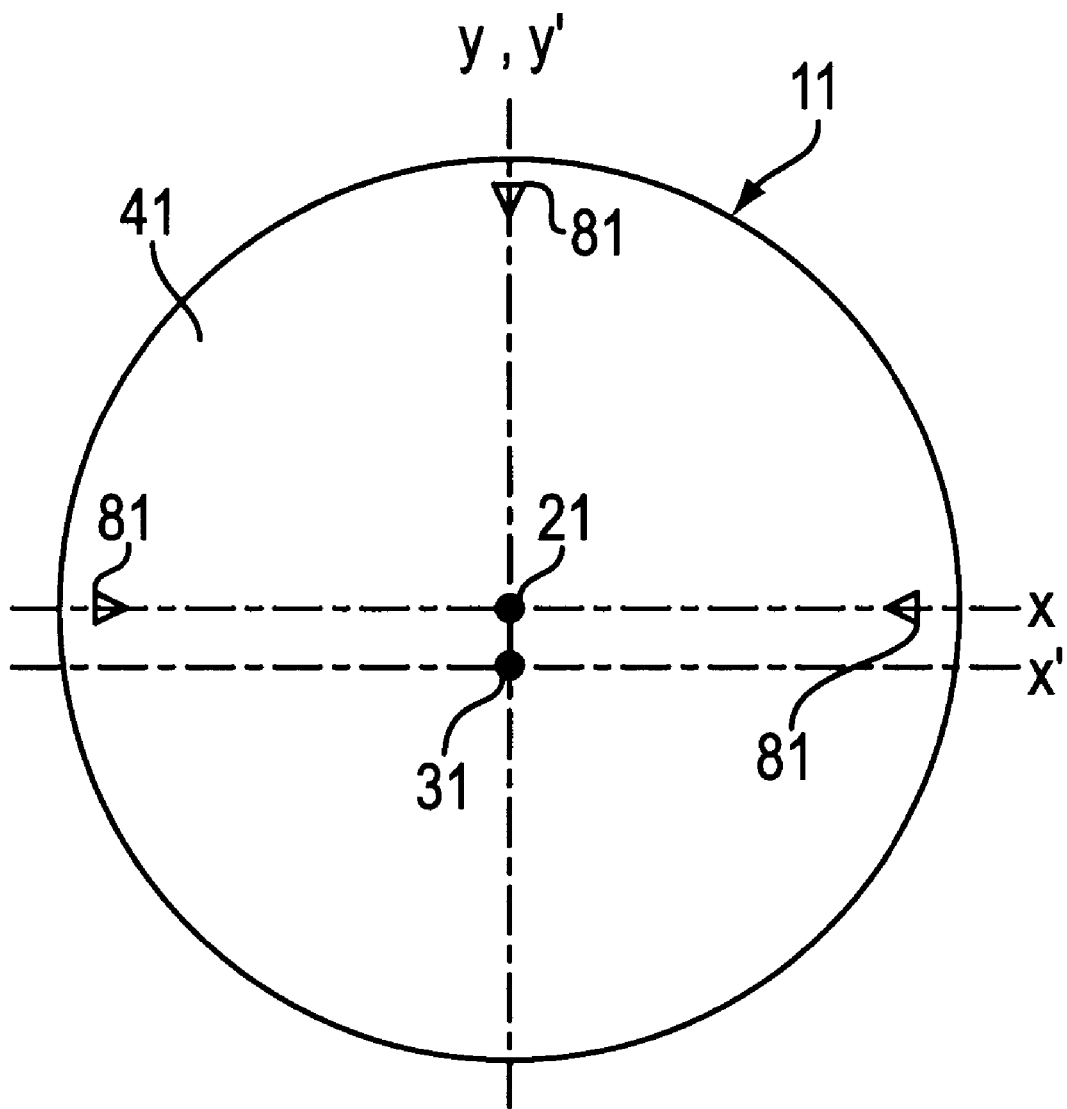
FIG. 1 is a front view of a first embodiment of a spectacle lens.
Figure 2:
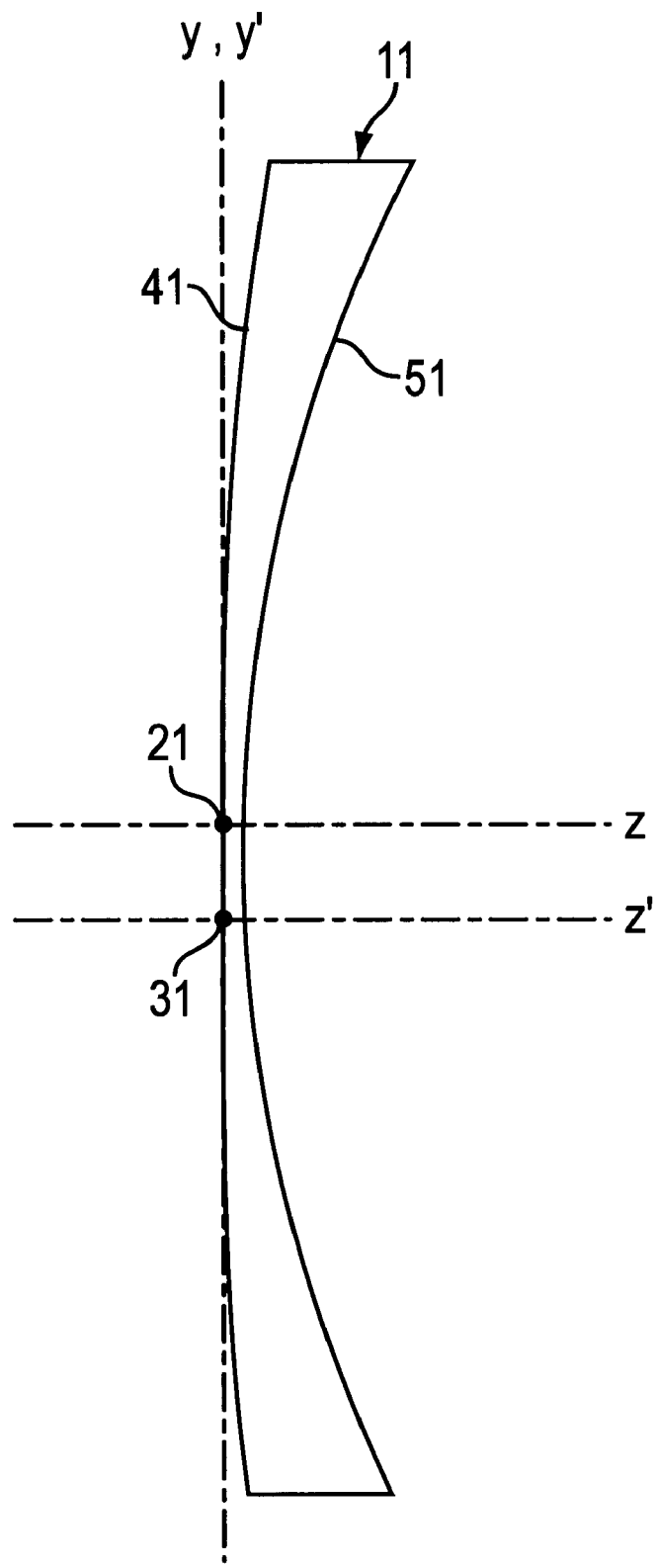
FIG. 2 is a cross-sectional view of the spectacle lens shown in FIG. 1, taken along the main meridian thereof.
Figure 3:
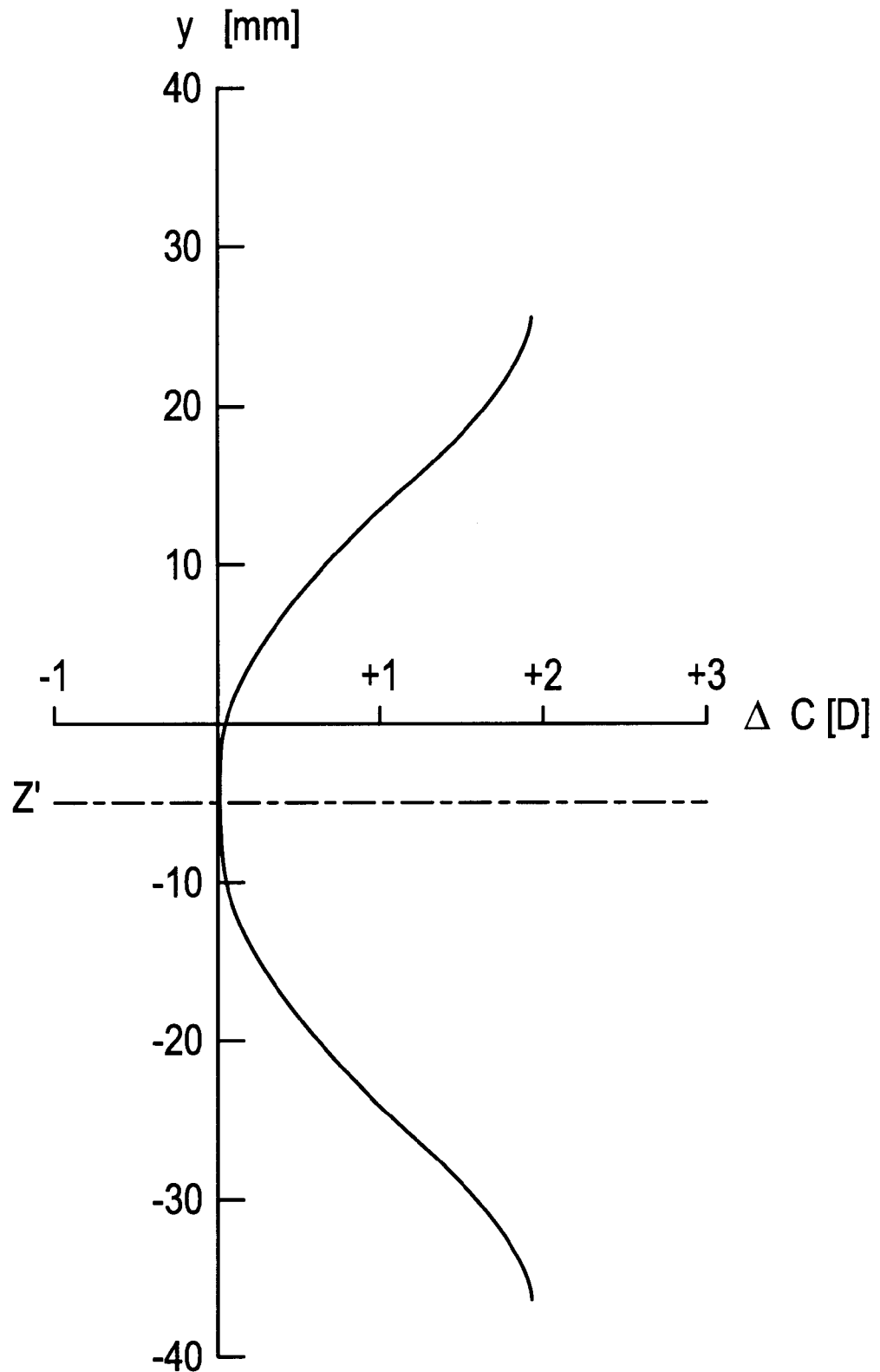
FIG. 3 is a graph showing a variation of curvature of a meridian of the spectacle lens shown in FIG. 1.

In FIG. 1, the spectacle lens 11, provided as an uncut finished spectacle lens. The main meridian thereof extends in a vertical direction of FIG. 1. In FIG. 2, a cross-sectional view of the spectacle lens 11 is taken along the main meridian.

The spectacle lens 11 is provided on a front surface 41 thereof with three reference markings (alignment reference markings) 81 for positioning the spectacle lens 11 with respect to a spectacle frame (not shown). Each reference marking 81 is marked in the form of a triangle without the inside thereof being painted. Two of the three reference markings 81 are located apart from each other on a horizontal plane which contains a horizontal tangent line x tangential to an intersection 21 of a center axis z (see FIG. 2) of the lens 11 with the front surface 41. The center axis z extends through the geometric center (i.e., center of configuration) of the lens 11. Also the two reference markings 81 are separated, equidistant from a vertical plane through the intersection 21. The remaining reference marking 81 is located on a vertical plane which contains a vertical tangent line y tangential to the intersection 21. Each reference marking 81 is located in the vicinity of the periphery of the lens 11.

The center axis z extends perpendicular to both the horizontal and vertical tangent lines x and y. Namely, the horizontal and vertical axes x and y and the center axis z extend perpendicular to one another.

The front and rear surfaces 41 and 51 of the spectacle lens 11 are formed as a rotationally-symmetrical aspherical surface and a spherical surface, respectively. The reference numeral 31 designates the center of the rotationally-symmetrical aspherical surface (i.e., aspherical surface center). Horizontal and vertical tangent lines x' and y' are each tangential to the aspherical surface center 31 and perpendicular to each other. Reference mark z' designates an axis of symmetry of the rotationally-symmetrical aspherical surface on the front surface 41. The axis of symmetry z' extends through the aspherical surface center 31, perpendicular to both the horizontal and vertical tangent lines x' and y'. The horizontal and vertical tangent lines x' and y' and the axis of symmetry z' extend perpendicular to one another.

Data regarding the spectacle lens 11 is shown below in Table 1.

TABLE 1

Vertex Power −6.00 D

Front Surface paraxial curvature +2.17 D (rotationally-symmetrical aspherical surface; the center thereof is positioned below the intersection 21 by a distance of 5 mm)

Rear Surface curvature −12.22 D (spherical surface)

Refractive Index 1.60

Diameter $\phi$72 mm

Central Thickness 1.0 mm

Peripheral Thickness 7.6 mm

Prism Power at the Center of Aspherical Surface 2.8$\Delta$ down

As noted above, the rear surface 51 of the spectacle lens 11 is formed to be a spherical surface whose curvature is −12.22 D, whereas the front surface of the same is formed to be a rotationally-symmetrical aspherical surface whose paraxial curvature is +2.17 D. Further, the aspherical surface center 31 is shifted downwards by 5 mm along the direction of the vertical tangent line y or y' from the intersection 21 of the center axis z with the front surface of the lens 11. That is, the axis of symmetry z' of the rotationally-symmetrical aspherical surface is positioned below the geometric center of the spectacle lens 11. The curvature of the rotationally-symmetrical aspherical surface along a meridian thereof increases the further away from the aspherical surface center 31 (i.e., the nearer to the periphery), by a distance of up to approximately 30 mm, as can be seen from FIG. 3.

Embodiment 2

Figure 8:
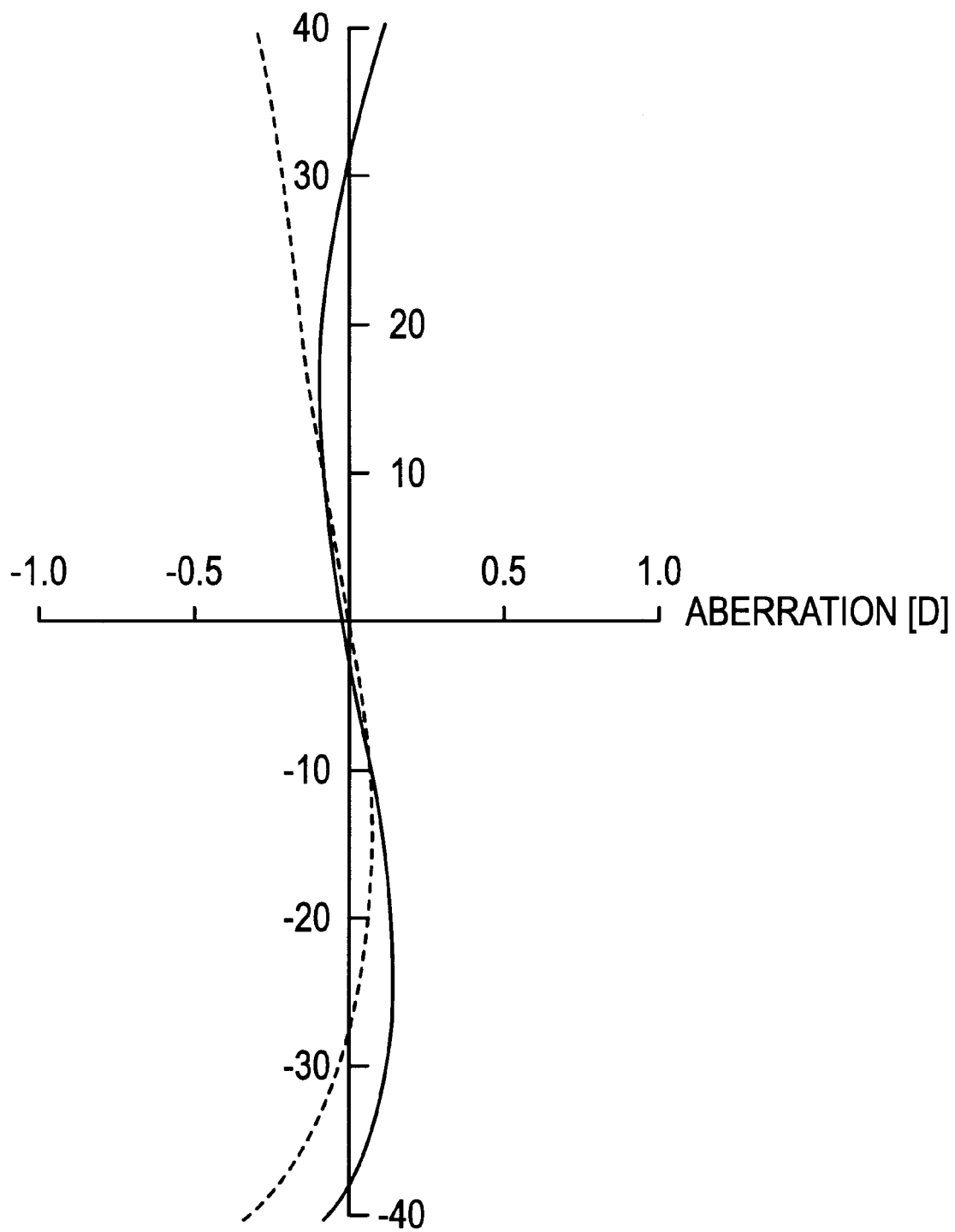
FIG. 8 is a graph showing an astigmatism and a field curvature with respect to the angle of sight of the spectacle lens shown in FIG. 5.
Figure 9:
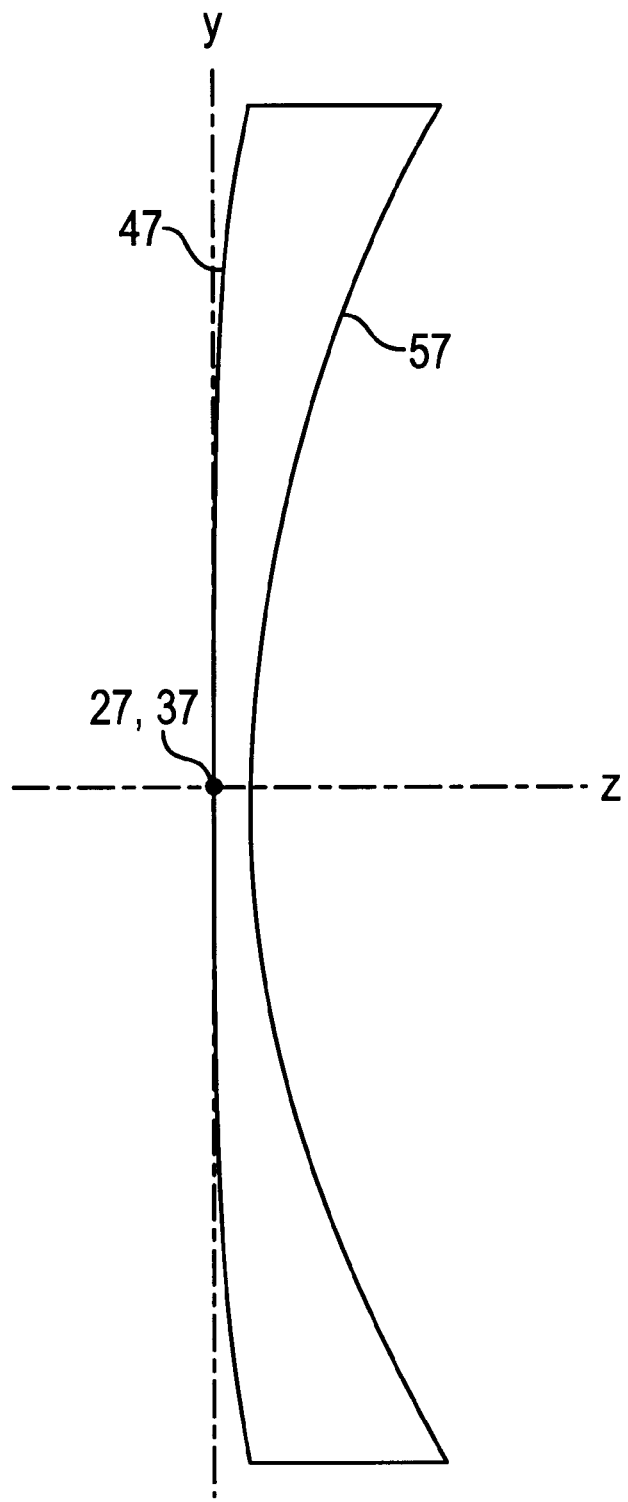
FIG. 9 is a cross-sectional view of a conventional spectacle lens (example 1), taken along the main meridian thereof.
Figure 10:
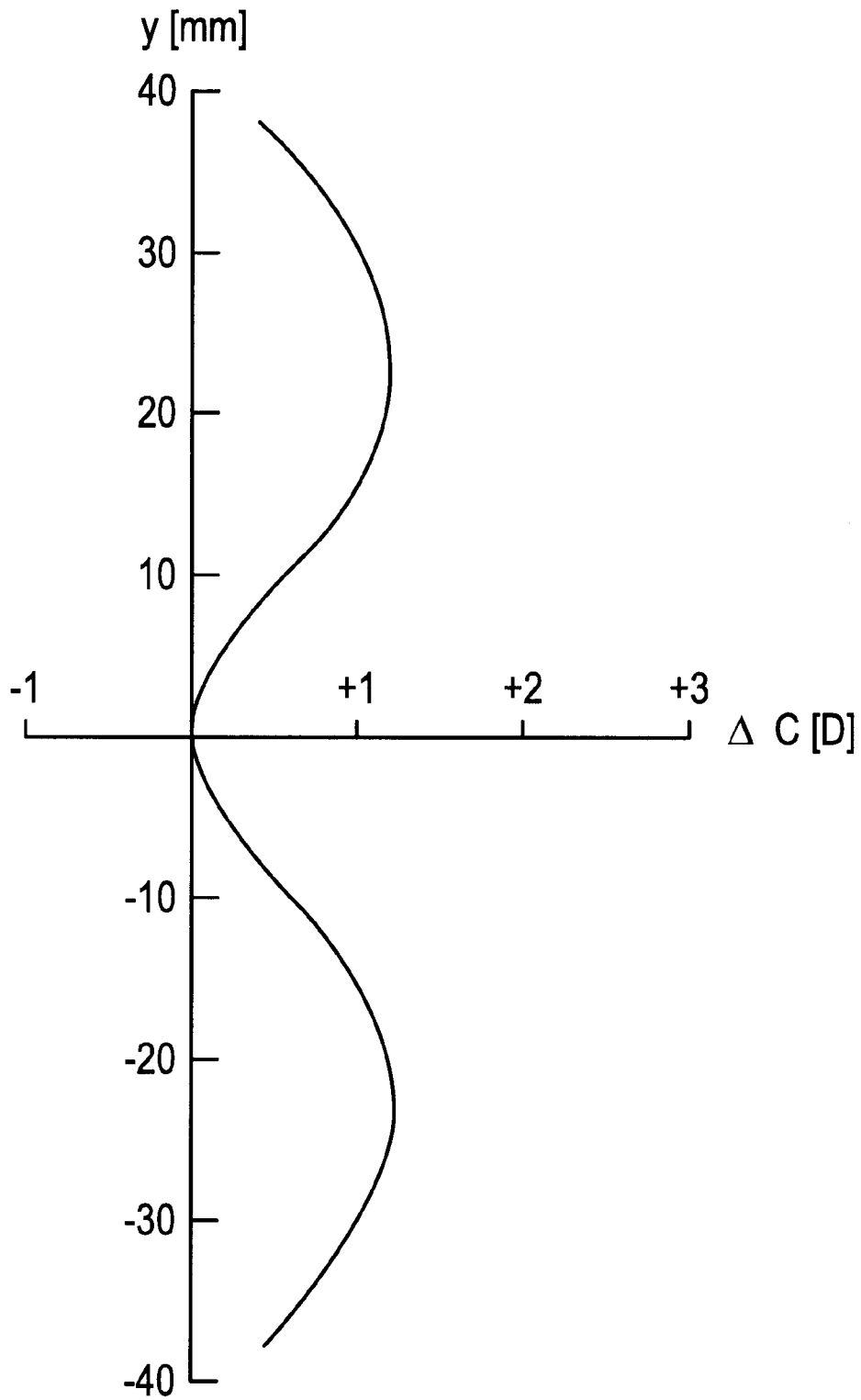
FIG. 10 is a graph showing a variation of curvature of a meridian of the spectacle lens shown in FIG. 9.
Figure 11:
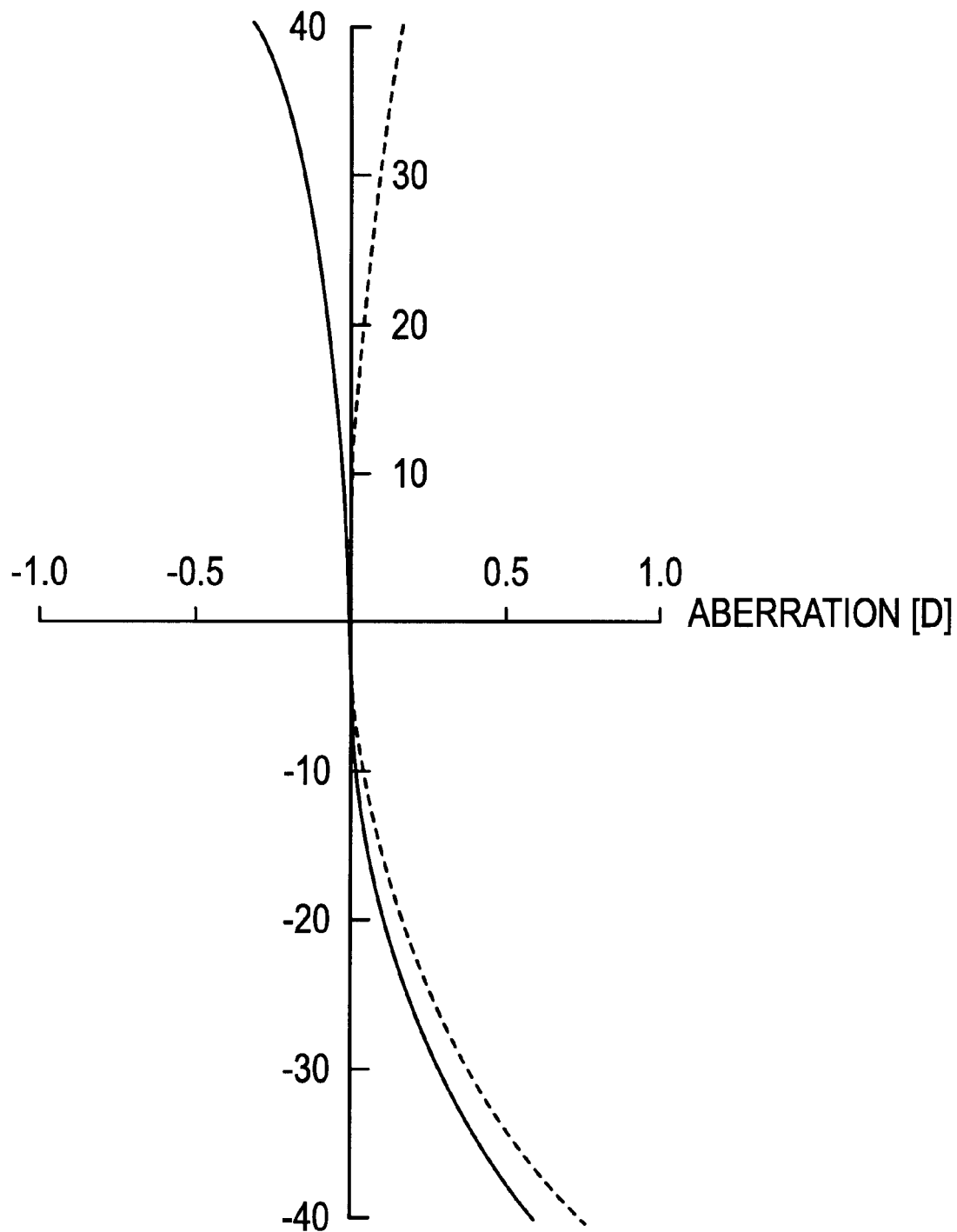
FIG. 11 is a graph showing an astigmatism and a field curvature with respect to the angle of sight of the spectacle lens shown in FIG. 9.
Figure 12:
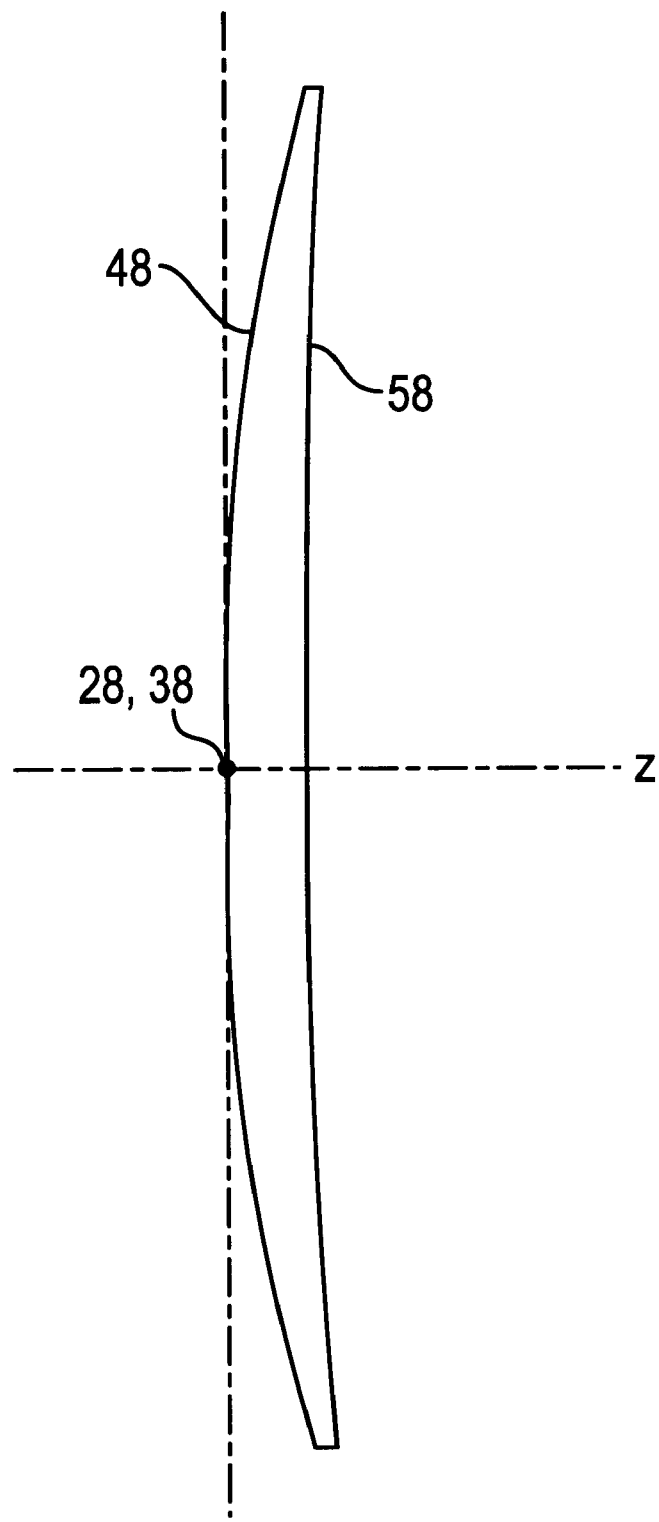
FIG. 12 is a cross-sectional view of another conventional spectacle lens (example 2), taken along the main meridian thereof.
Figure 13:
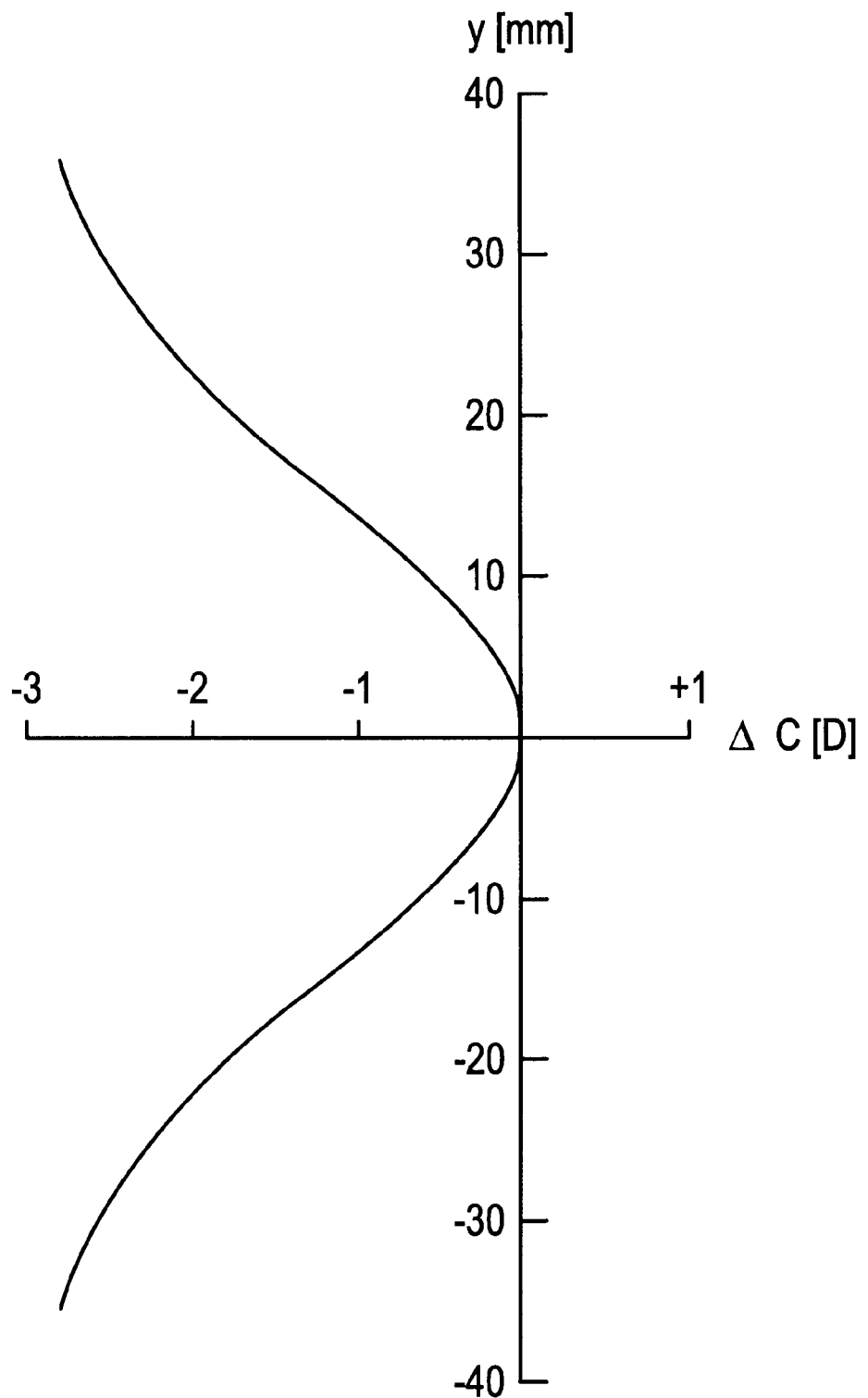
FIG. 13 is a graph showing a variation of curvature of a meridian of the spectacle lens shown in FIG. 12.
Figure 14:
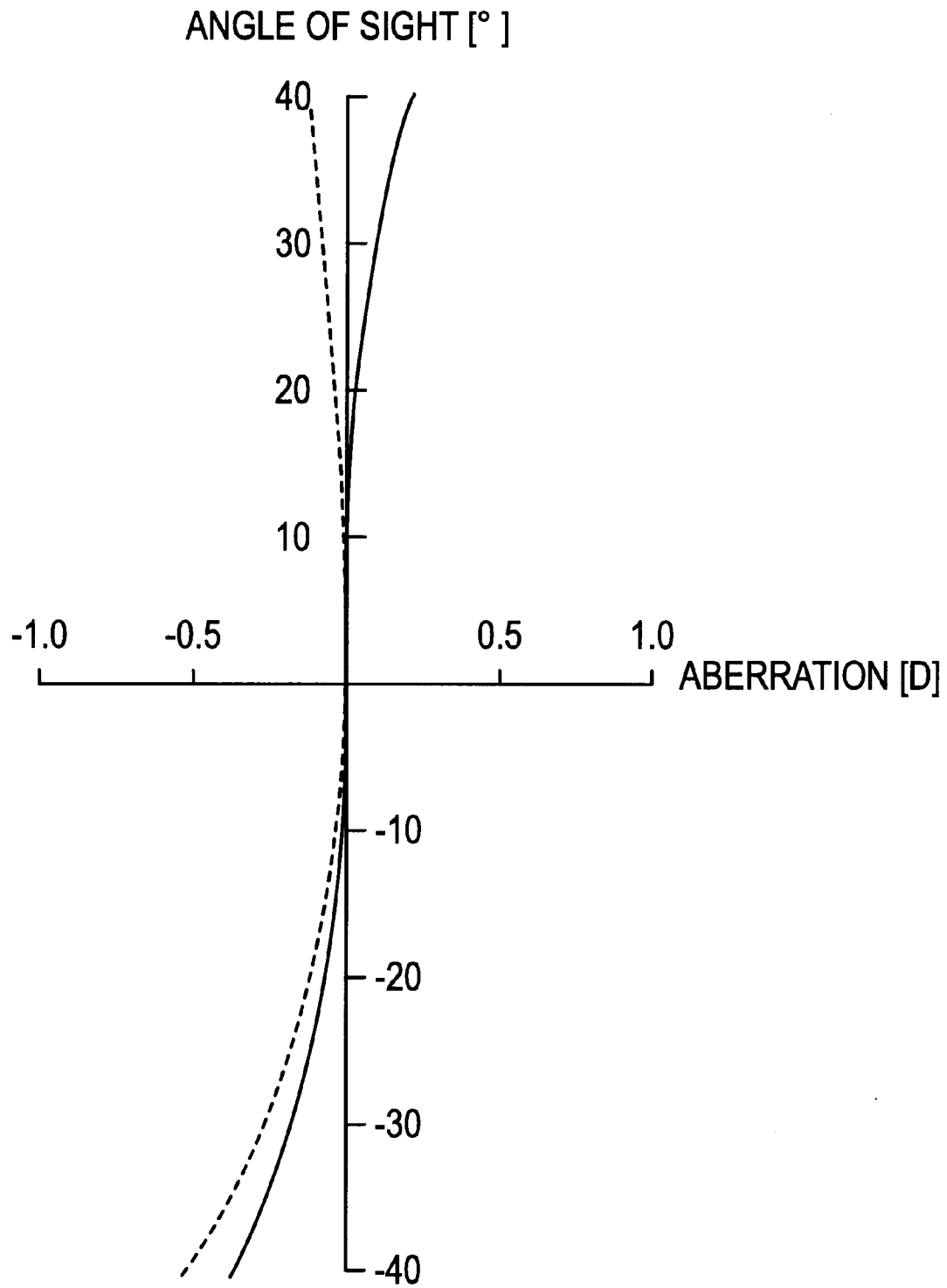
FIG. 14 is a graph showing an astigmatism and a field curvature with respect to the angle of sight of the spectacle lens shown in FIG. 12.
Figure 15:
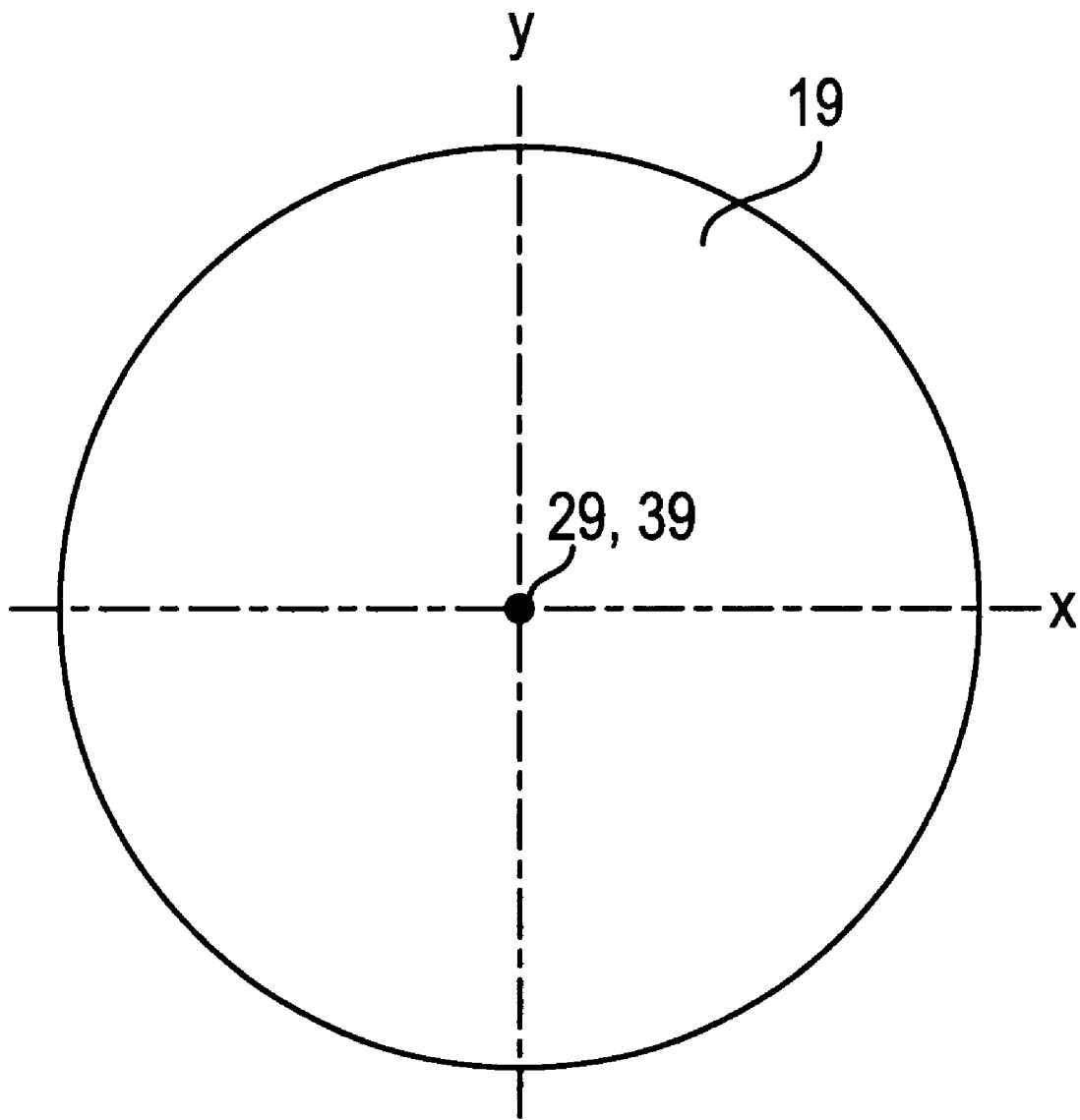
FIG. 15 is a front view of still another conventional spectacle lens (example 3)
Figure 16:
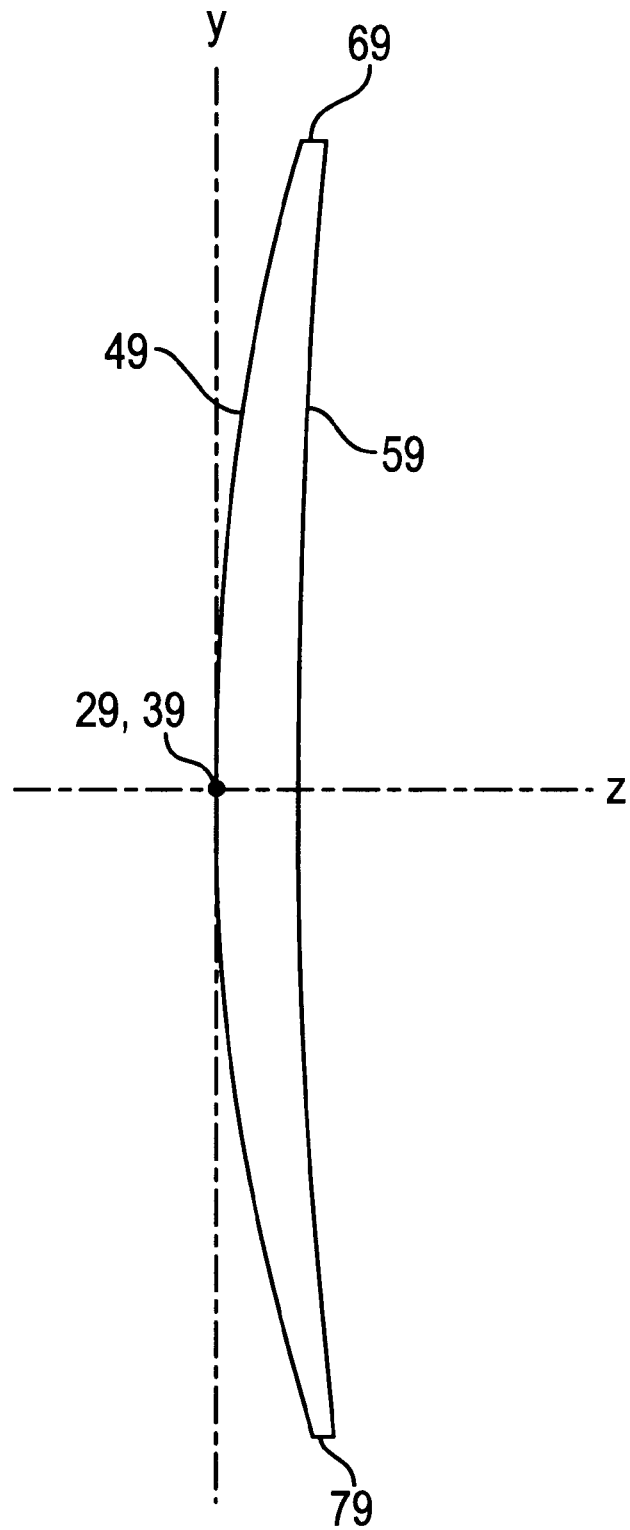
FIG. 16 is a cross-sectional view of the spectacle lens shown in FIG. 15, taken along the main meridian thereof.
Figure 17:
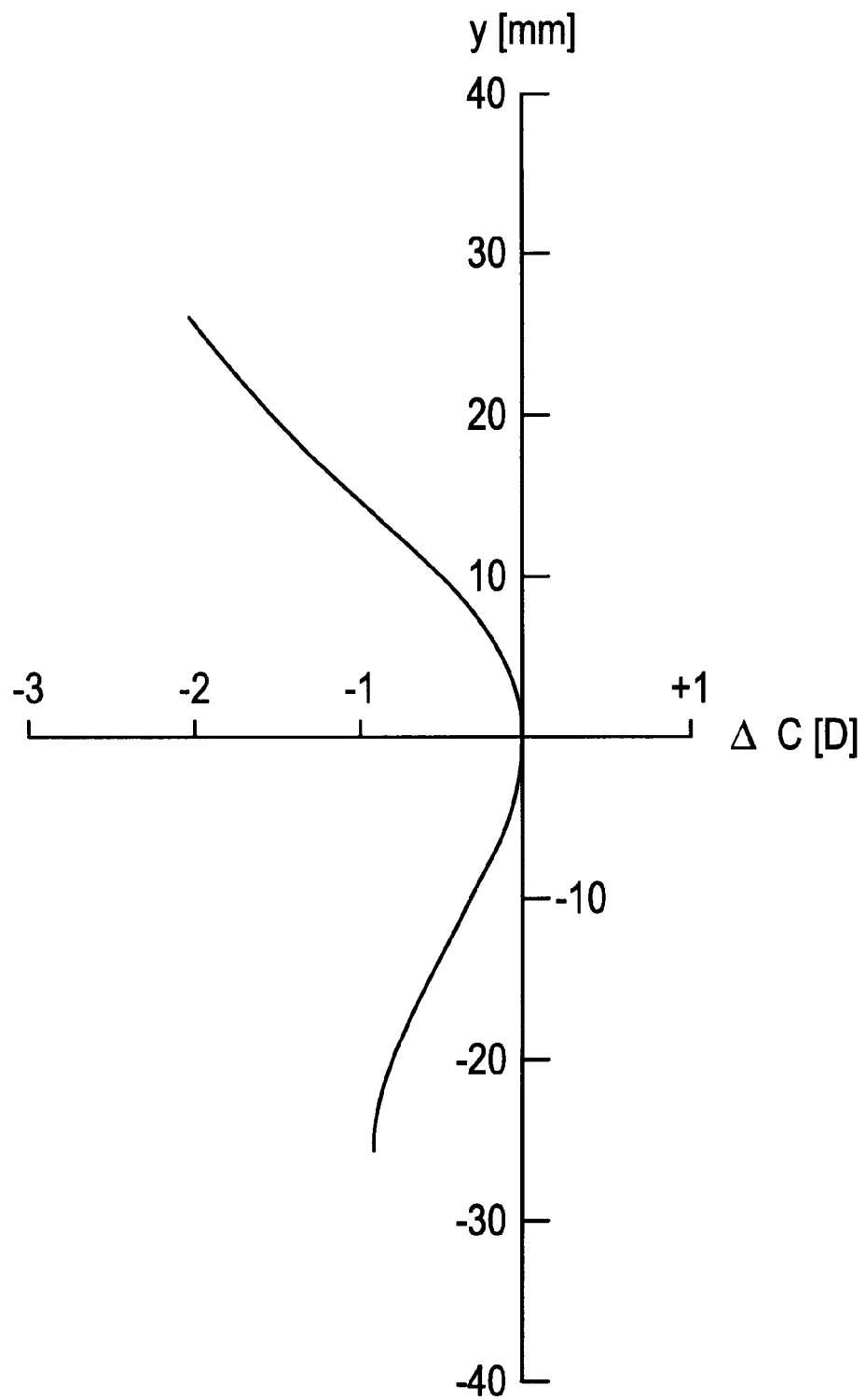
FIG. 17 is a graph showing a variation of curvature of a meridian of the spectacle lens shown in FIG. 15.
Figure 18:
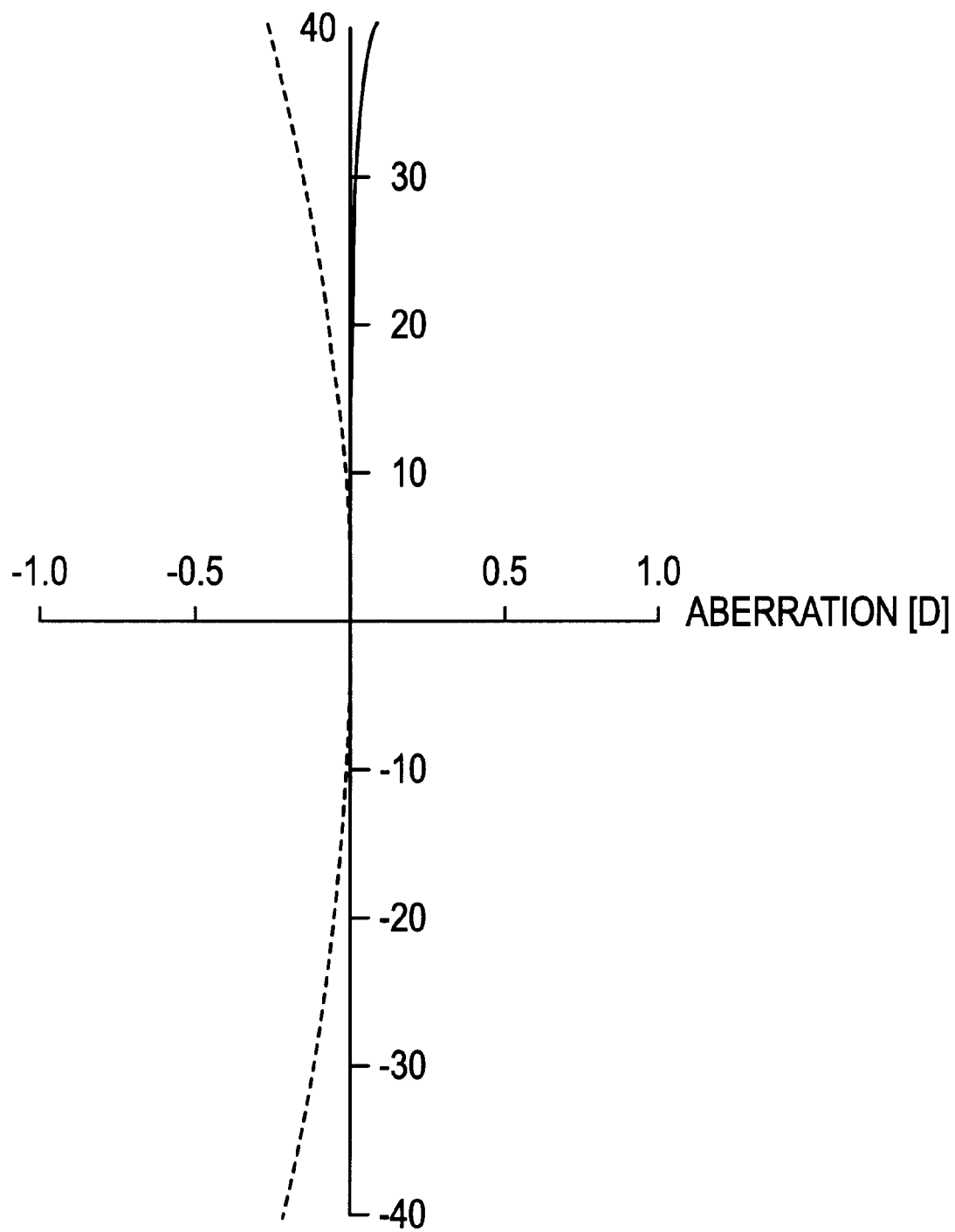
FIG. 18 is a graph showing an astigmatism and a field curvature with respect to the angle of sight of the spectacle lens shown in FIG. 15.

FIGS. 5 through 8 show a second embodiment of a spectacle lens for correcting eyesight. This spectacle lens 12 is a positive lens intended for far-sightedness. In FIG. 8, the vertical axis of the graph represents an angle of sight in degrees, and the horizontal axis of the graph represents an aberration in diopters based on a reference refractive power in a sagittal direction of the lens. The solid line represents the astigmatism of the lens 12 while the dotted line represents the field curvature of the lens 12. The astigmatism and the field curvature of the lens 12 in the positive range of the angle of sight (from 0 to approximately 40 degrees) represents those when an object at infinity ($\infty$) is viewed through the upper half portion of the lens 12. The astigmatism and the field curvature of the lens 12 in the negative range of the angle of sight (from 0 to approximately −40 degrees) represents those when an object 30 cm away from the lens 12 is viewed through the lower half portion of the lens 12.

Figure 5:
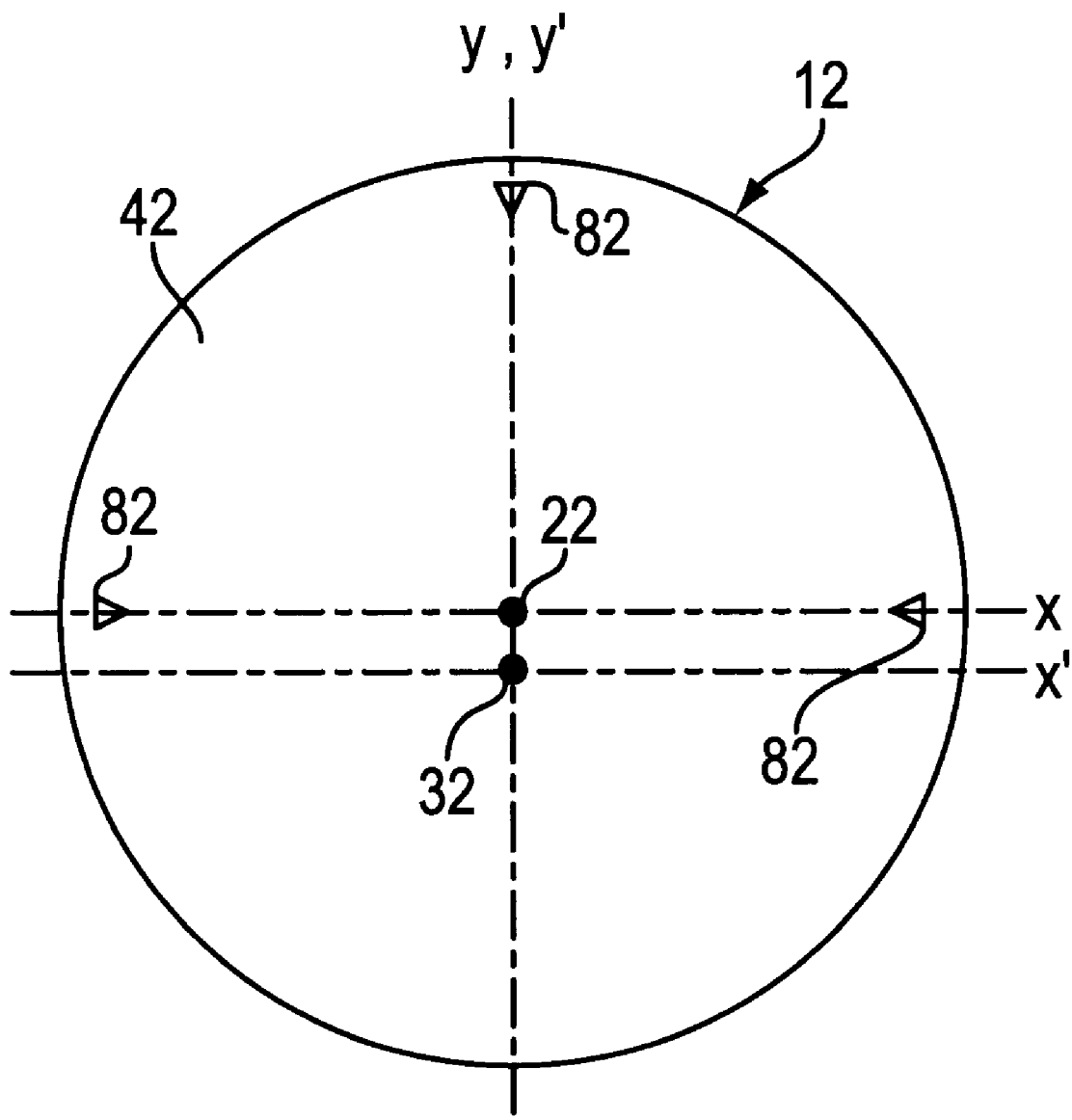
FIG. 5 is a front view of a second embodiment of a spectacle lens.
Figure 6:
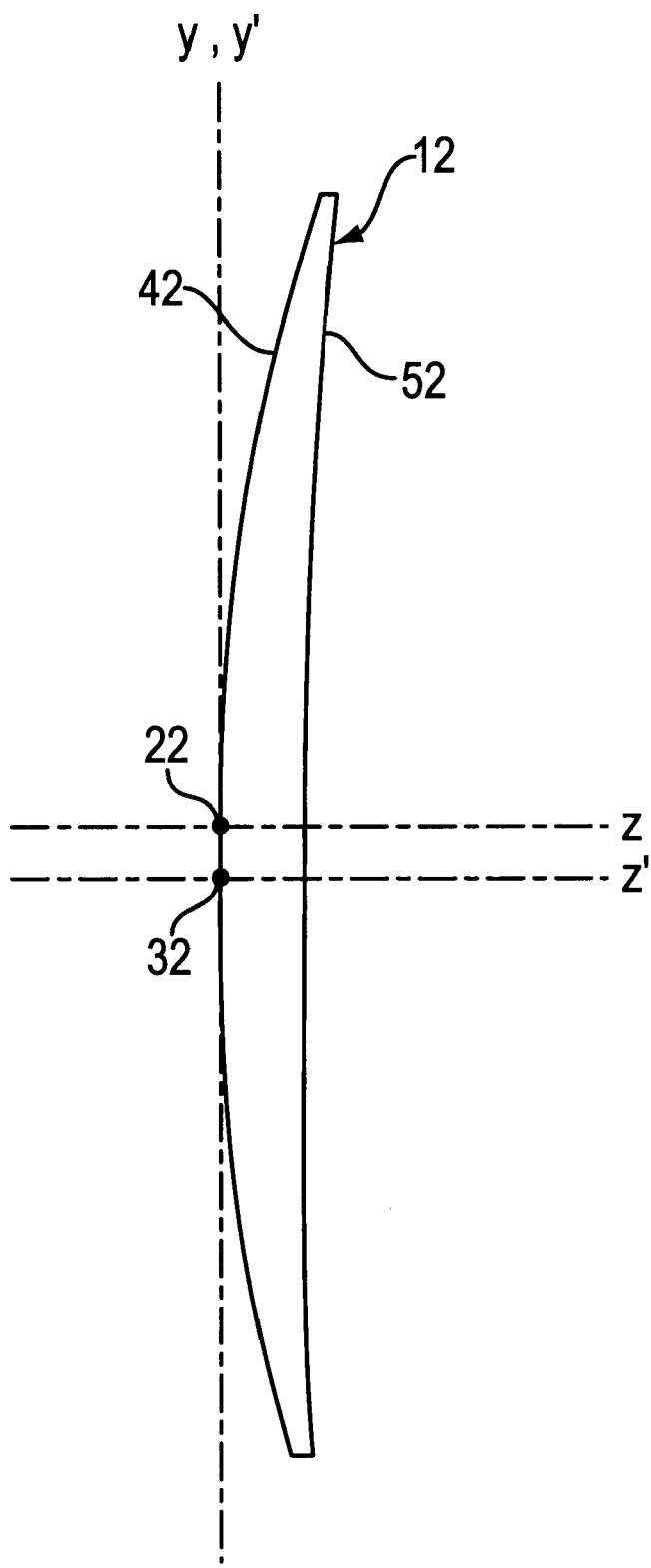
FIG. 6 is a cross-sectional view of the spectacle lens shown in FIG. 5, taken along the main meridian thereof.
Figure 7:
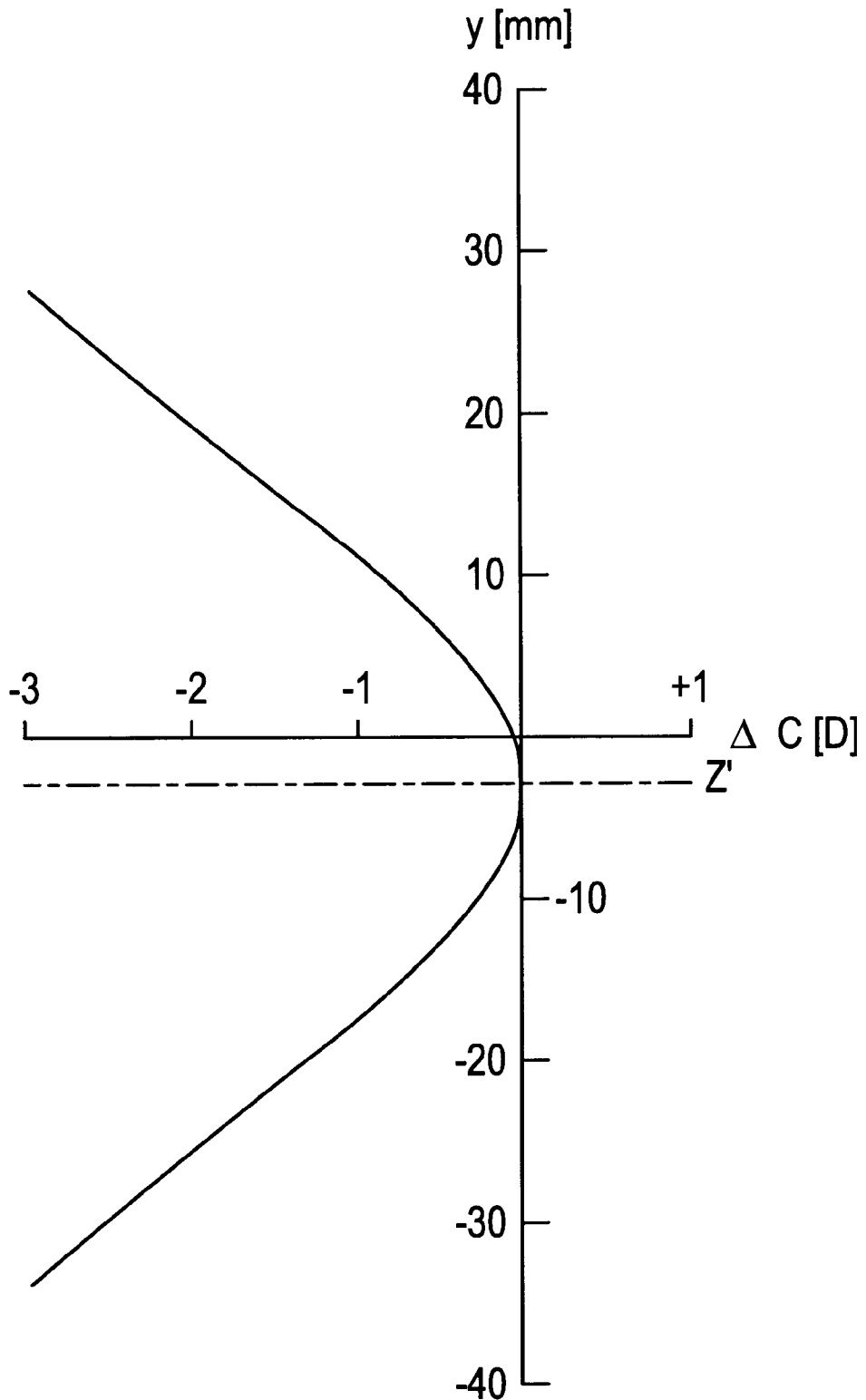
FIG. 7 is a graph showing a variation of curvature of a meridian of the spectacle lens shown in FIG. 5.

In FIG. 5, the spectacle lens 12, provided as an uncut finished spectacle lens, is shown such that the main meridian thereof extends in a vertical direction of FIG. 5. In FIG. 6, a cross-sectional view of the spectacle lens 12 is taken along the main meridian.

Similarly to the first embodiment of the spectacle lens 11, the spectacle lens 12 is provided on a front surface 42 thereof with three reference markings (alignment reference markings) 82 for positioning the spectacle lens 12 with respect to a spectacle frame (not shown). Each reference marking 82 is marked in the form of a triangle without the inside thereof being painted. Two of the three reference markings 82 are located apart from each other on a horizontal plane which contains a horizontal tangent line x tangential to an intersection 22 of a center axis z (see FIG.

6) of the lens 12 with the front surface 42. The center axis z extends through the geometric center (i.e., center of configuration) of the lens 12. Also the two reference markings 82 are separated, equidistant from a vertical plane through the intersection 22. The remaining reference marking 82 is located on a vertical plane which contains a vertical tangent line y tangential to the intersection 22. Each reference marking 82 is located in the vicinity of the periphery of the lens 12.

The center axis z extends perpendicular to both the horizontal and vertical tangent lines x and y. Namely, the horizontal and vertical axes x and y and the center axis z extend perpendicular to one another.

The front and rear surfaces 42 and 52 of the spectacle lens 12 are formed as a rotationally-symmetrical aspherical surface and a spherical surface, respectively. The reference numeral 32 designates the center of the rotationally-symmetrical aspherical surface (i.e., aspherical surface center). Horizontal and vertical tangent lines x' and y' are each tangential to the aspherical surface center 32. Reference mark z' designates an axis of symmetry of the rotationally-symmetrical aspherical surface on the front surface 42. The axis of symmetry z' extends through the aspherical surface center 32, perpendicular to both the horizontal and vertical tangent lines x' and y'. The horizontal and vertical tangent lines x' and y' and the axis z' extend perpendicular to one another.

Data regarding the spectacle lens 12 is shown below in Table 2.

TABLE 2

Vertex Power +4.00 D

Front Surface paraxial curvature +8.50 D (rotationally-symmetrical aspherical surface; the center thereof is positioned below the intersection 22 by a distance of 3 mm.)

Rear Surface curvature −1.92 D (spherical surface)

Refractive Index 1.60

Diameter φ68 mm

Central Thickness 4.4 mm

Peripheral Thickness 1.0 mm

Prism Power at the Center of Aspherical Surface 1.0Δ up

As noted above, the rear surface of the spectacle lens 12 is formed to be a spherical surface whose curvature is −1.92 D, whereas the front surface of the same is formed to be a rotationally-symmetrical aspherical surface whose paraxial curvature is +8.50 D. Further, the aspherical surface center 32 is shifted downwards by 3 mm along the direction of the vertical tangent line y or y' from the intersection 22 of the center axis z with the front surface of the lens 12. That is, the axis of symmetry z' of the rotationally-symmetrical aspherical surface is positioned below the geometric center of the spectacle lens 12. The curvature of the rotationally-symmetrical aspherical surface along a meridian thereof decreases the further away from the aspherical surface center 32 (i.e., the nearer to the periphery), by a distance of up to approximately 30 mm, as can be seen from FIG. 7.

As will be appreciated from the foregoing, the spectacle lens to which the present invention is applied is provided at its front and rear surfaces with a rotationally-symmetrical aspherical surface and a spherical surface, respectively, and the main feature of the spectacle lens is in that the axis of symmetry of the rotationally-symmetrical aspherical surface is separated from the geometric center of the lens. It is not difficult to make a spectacle lens having such a structural feature, thereby the cost of production can be reduced.

The spectacle lens to which the present invention is applied also has a structure in which the curvature of the aspherical surface along a meridian thereof increases and decreases the further apart from the center of the aspherical surface (i.e., the nearer to the periphery of the aspherical surface), when the lens is a negative lens and a positive lens, respectively, and further in which the axis of symmetry of the rotationally-symmetrical aspherical surface is positioned below the geometric center of the lens, so that an excellent optical performance is obtained through the whole object distance range, from near to far distances.

Furthermore, when the spectacle lens is a negative lens, its axis of symmetry of the rotationally-symmetrical aspherical surface extends through a part of the spectacle lens whose thickness increases and decreases in a direction downwards and upwards, respectively, as can be seen from FIG. 2. Conversely, when the spectacle lens is a positive lens, its axis of symmetry of the rotationally-symmetrical aspherical surface extends through a part of the spectacle lens whose thickness increases and decreases in a direction upwards and downwards, respectively, as can be seen from FIG. 6. Accordingly, a lens, the thicknesses of the periphery of the lens at upper and lower portions can be made even to improve the appearance of the lens.

In each of the first and second embodiments, although the rear surface 51 or 52 of the spectacle lens 11 or 12 is formed to be a spherical surface, the rear surface 51 or 52 may be formed to be a toric surface.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A spectacle lens having a geometric center, comprising front and rear surfaces each formed as a refractive surface, at least one of said front and rear surfaces being formed as an aspherical surface that is rotationally symmetrical about an axis of symmetry extending through the aspherical surface, wherein said axis of symmetry is separated from said geometric center.

2. The spectacle lens according to claim 1, wherein said axis of symmetry is positioned below said geometric center.

3. The spectacle lens according to claim 1, wherein said lens has a negative vertex power, and wherein a curvature of said aspherical surface along a meridian thereof increases as a distance from a center of said aspherical surface to a periphery of said aspherical surface increases, at least in a range of 10 to 20 mm from a center of said aspherical surface to said periphery along said meridian.

4. The spectacle lens according to claim 1, wherein said lens has a positive vertex power, and wherein a curvature of said aspherical surface along a meridian thereof decreases as a distance from a center of said aspherical surface to a periphery of said aspherical surface increases, at least in a range of 10 to 20 mm from a center of said aspherical surface to said periphery along said meridian.

5. The spectacle lens according to claim 1, wherein one of said front and rear surfaces has said aspherical surface, and wherein the other of said front and rear surfaces is formed as one of a spherical surface and a toric surface.

6. The lens of claim 1, wherein the lens is a corrective lens.

7. The spectacle lens according to claim 2, further comprising at least one reference marking for positioning said spectacle lens with respect to a spectacle frame.

8. The spectacle lens according to claim 1, wherein the spectacle lens has a prismatic power at a center of the aspherical surface through which the axis of symmetry extends.

9. A spectacle lens, comprising:

front and rear surfaces each formed as a refractive surface, at least one of said front and rear surfaces being an aspherical surface with rotational symmetry about an axis of symmetry; and at least one reference marking formed on said spectacle lens for positioning said spectacle lens with respect to a spectacle frame, wherein said axis of symmetry extends through a part of said spectacle lens, the thickness of said part increasing and decreasing in a direction downwards and upwards from said axis of symmetry in the vicinity of said axis of symmetry, respectively, and said spectacle lens having a negative vertex power.

10. The spectacle lens according to claim 9, wherein a curvature of said aspherical surface along a meridian thereof increases as a distance from a center of said aspherical surface to a periphery of said aspherical surface increases, at least in a range of 10 to 20 mm from said center of said aspherical surface to said periphery along said meridian.

11. A spectacle lens, comprising:

front and rear surfaces each formed as a refractive surface, at least one of said front and rear surfaces being an aspherical surface with rotational symmetry about an axis of symmetry; and at least one reference marking formed on said spectacle lens for positioning said spectacle lens with respect to a spectacle frame, wherein said axis of symmetry extends through a part of said spectacle lens, the thickness of said part increasing and decreasing in a direction upwards and downwards from said axis of symmetry in the vicinity of said axis of symmetry, respectively, and said spectacle lens having a positive vertex power.

12. The spectacle lens according to claim 11, wherein a curvature of said aspherical surface along a meridian thereof decreases as a distance from a center of said aspherical surface to a periphery of said aspherical surface increases, at least in a range of 10 to 20 mm from said center of said aspherical surface to said periphery along said meridian.

* * * * *